May 28, 1957 — C. F. HENNEY ET AL — 2,793,834
VEHICLE REFRIGERATING APPARATUS
Filed Oct. 4, 1954 — 5 Sheets-Sheet 1

Fig. 1

INVENTORS
Charles F. Henney
Ira L. Gould
BY
R. R. Candor
Their Attorney

Fig. 2

May 28, 1957  C. F. HENNEY ET AL  2,793,834
VEHICLE REFRIGERATING APPARATUS
Filed Oct. 4, 1954  5 Sheets-Sheet 4

INVENTORS
Charles F. Henney
Ira L. Gould
BY
R. R. Candor
Their Attorney

United States Patent Office 2,793,834
Patented May 28, 1957

2,793,834

VEHICLE REFRIGERATING APPARATUS

Charles F. Henney, Dayton, and Ira L. Gould, Hamilton, Ohio, assignors to General Motors Corporation, Detroit, Mich., a corporation of Delaware Application October 4, 1954, Serial No. 459,896

12 Claims. (Cl. 257—3)

This invention relates to refrigerating apparatus and more particularly to a refrigerated railway car.

It is an object of this invention to provide a compact and reliable refrigeration system which may be added to existing refrigerator cars as well as newly constructed cars.

One of the objects of the invention is to provide a refrigerated car in which two completely independent refrigeration systems are provided whereby in the event of failure in one of the refrigeration systems the remaining system will continue to refrigerate the contents of the car until the necessary repairs have been made or the car has been unloaded.

Another object of this invention is to so construct and arrange the elements of the two refrigerating systems that the load on each is uniform.

Still another object of this invention is to provide a refrigeration system in which there is a quick and positive return of oil from the evaporator to the compressor means.

A further object of this invention is to so construct and arrange the evaporators that the incoming air to be cooled flows in countercurrent relationship to the liquid refrigerant supplied to the evaporator.

Still another object of this invention is to provide an improved arrangement for circulating air through the machinery compartment so as to provide proper cooling for both the refrigerant condenser and the internal combustion engine which supplies power for the refrigeration equipment.

Further objects and advantages of the present invention will be apparent from the following description, reference being had to the accompanying drawings, wherein a preferred form of the present invention is clearly shown.

Referring now to the drawing wherein a preferred embodiment has been shown, reference numeral 10 generally designates a railway car having a food storage compartment 12 and a machinery compartment 14, which are separated from one another by means of a vertical wall 16. Suitable insulation 18 completely surrounds the food storage compartment 12 so as to limit the infiltration of heat into the compartment 12.

The refrigeration equipment used for cooling the compartment 12 includes a dual evaporator assembly generally designated by the reference numeral 20 which is mounted intermediate the top and bottom of a vertical air duct 22 located adjacent the wall 16. A pair of blowers 24 driven by a common motor 25 and located adjacent the upper end of the passage 20 serve to pull air upwardly through the vertical air passage 22 and to discharge the air into a plenum chamber 26 located in the upper part of the commodity compartment 12 directly beneath the insulation 18 in the upper part of the car. This air passage 26 is preferably provided with a plurality of air outlet openings 28 through which the refrigerated air may flow downwardly into direct thermal exchange relationship with the contents of the commodity compartment 12. A perforated floor 30 is provided in the commodity compartment so as to allow air to return to the lower end of the vertical air passage 22 through a bottom horizontally extending duct 32.

A board wall 34 separates the air duct 22 from the commodity compartment 12. The evaporator assembly 20 is carried by a removable panel portion 36 which forms a part of the board wall 34 so that the evaporator assembly may be removed for inspection and/or repair purposes by removing the panel 36 from the commodity compartment side of the wall 34.

The evaporators may be defrosted by energizing the usual electric strip heating elements 39 which are controlled in a manner to be explained hereinafter. A condensate drain 38 is provided adjacent the lower end of the vertically extending air passage 22 so as to dispose of the defrost water. Electric heating means 41 are used for heating the condensate drain 38 during the defrosting operation.

Figure 4:
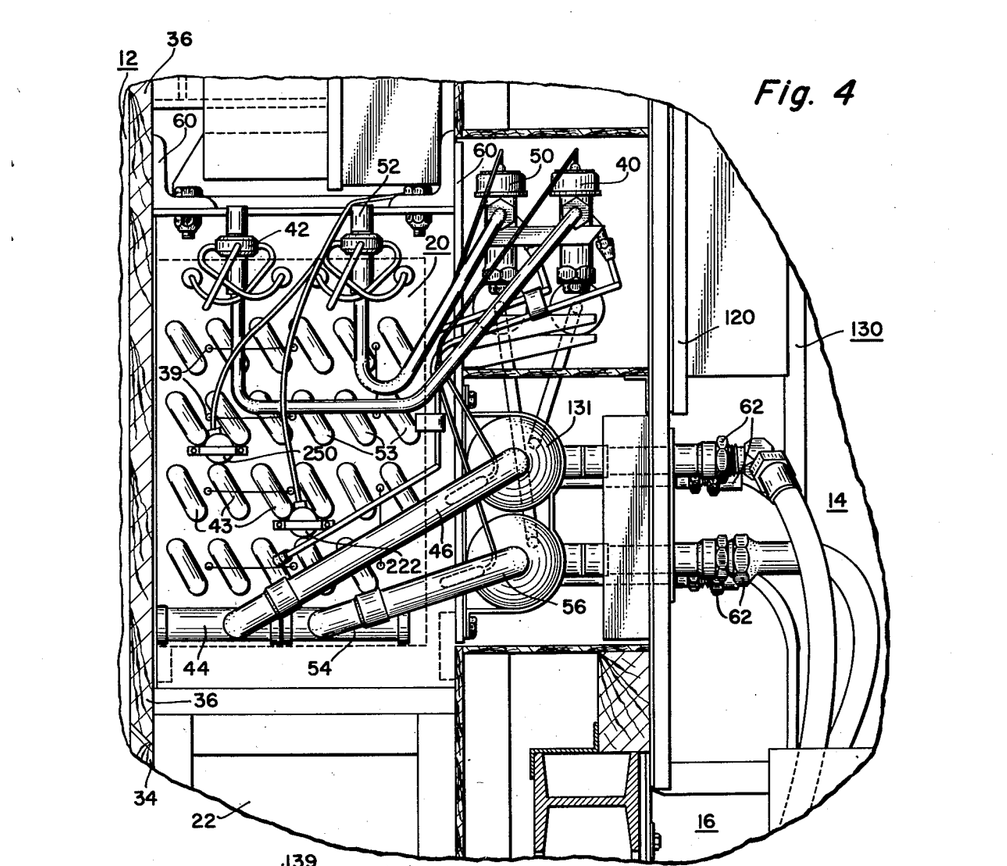
Figure 4 is a fragmentary sectional view on an enlarged scale showing the construction and arrangement of the evaporators and associated parts.

The evaporator assembly 20 preferably includes two completely independent evaporators as best shown in Figure 4 of the drawing. The two evaporators are provided with common end plates and common fins but have separate liquid and suction lines connected to separate refrigerant passages. Again referring to Figure 4 of the drawing, reference numeral 40 designates a thermostatic expansion valve which controls the flow of liquid refrigerant into a first distributor 42 connected to the three parallel refrigerant passages 43 shown on the left side of evaporator assembly 20 as viewed in Figure 4. The outlets of these three refrigerant passages communicate with a bottom header 44 connected to a suction line 46. A second thermostatic expansion valve 50 supplies liquid refrigerant to a distributor 52 which distributes liquid refrigerant into the three parallel passages 53 in the right one-half portion of the evaporator assembly. The outlets of these passages communicate with a bottom header 54 which communicates with the suction line 56.

The evaporator assembly 20, and the associated distributors and expansion valves are all supported as a unit by bracket means 60 carried by the removable panel 36. As best shown in Figure 4 of the drawings, detachable connections 62 are provided so as to facilitate disconnecting the evaporator assembly from the high side of the system.

Figure 1:
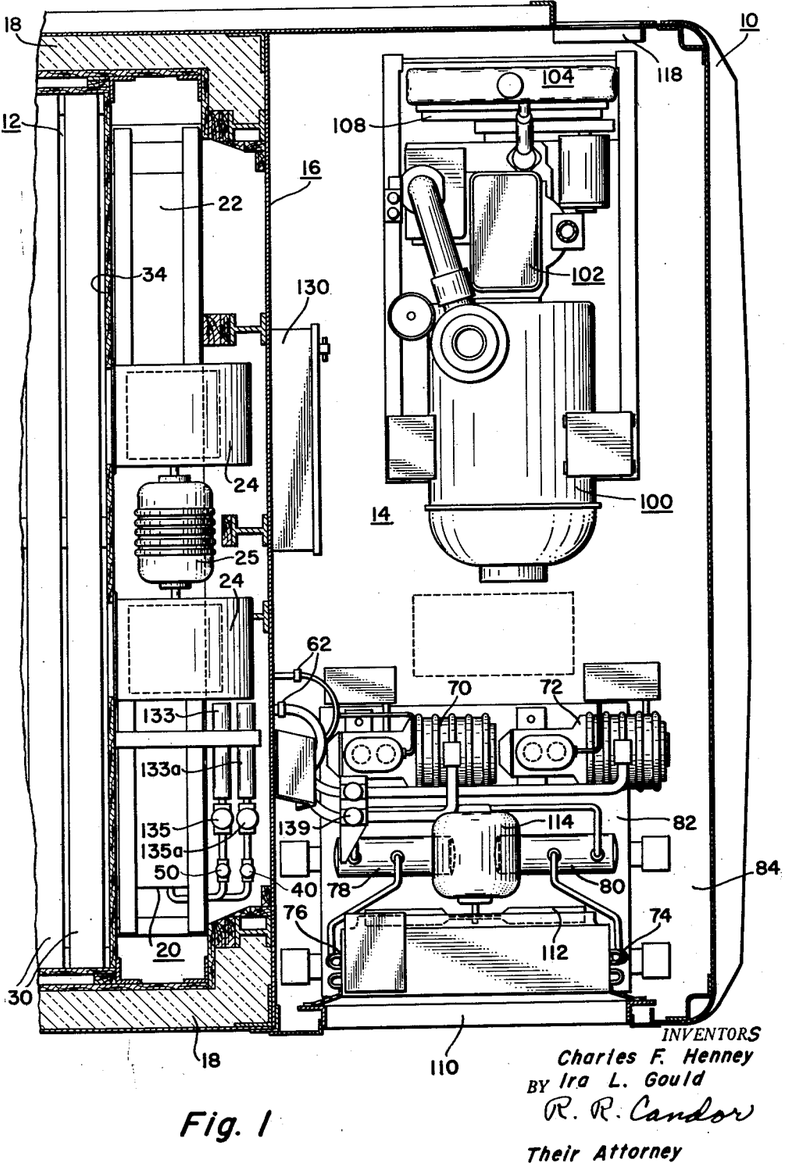
Figure 1 is a plan view with parts broken away showing the arrangement of the main power unit and the refrigeration equipment.

As best shown in Figure 1 of the drawing, the refrigerant liquefying mechanism comprises two separate sealed motor-compressor units generally designated by the reference numerals 70 and 72. These units discharge compressed refrigerant into two separate sections 74 and 76 of a condenser assembly. The condensed refrigerant leaving the condenser sections 74 and 76 enters receivers 78 and 80 respectively from whence the liquid refrigerant is supplied to the respective expansion valves 40 and 50. By virtue of the above described arrangement, it is obvious that the car is refrigerated by means of two entirely separate and distinct refrigeration systems whereby a failure of one of the systems would not result in a complete lack of refrigeration. While neither system is intended to have adequate capacity to supply maximum full load refrigeration requirements, each system does have enough capacity to provide enough refrigeration to maintain the contents of the car adequately refrigerated long enough to effect repair of the defunct system or unloading of the commodity compartment within a reasonable length of time.

Figure 3:
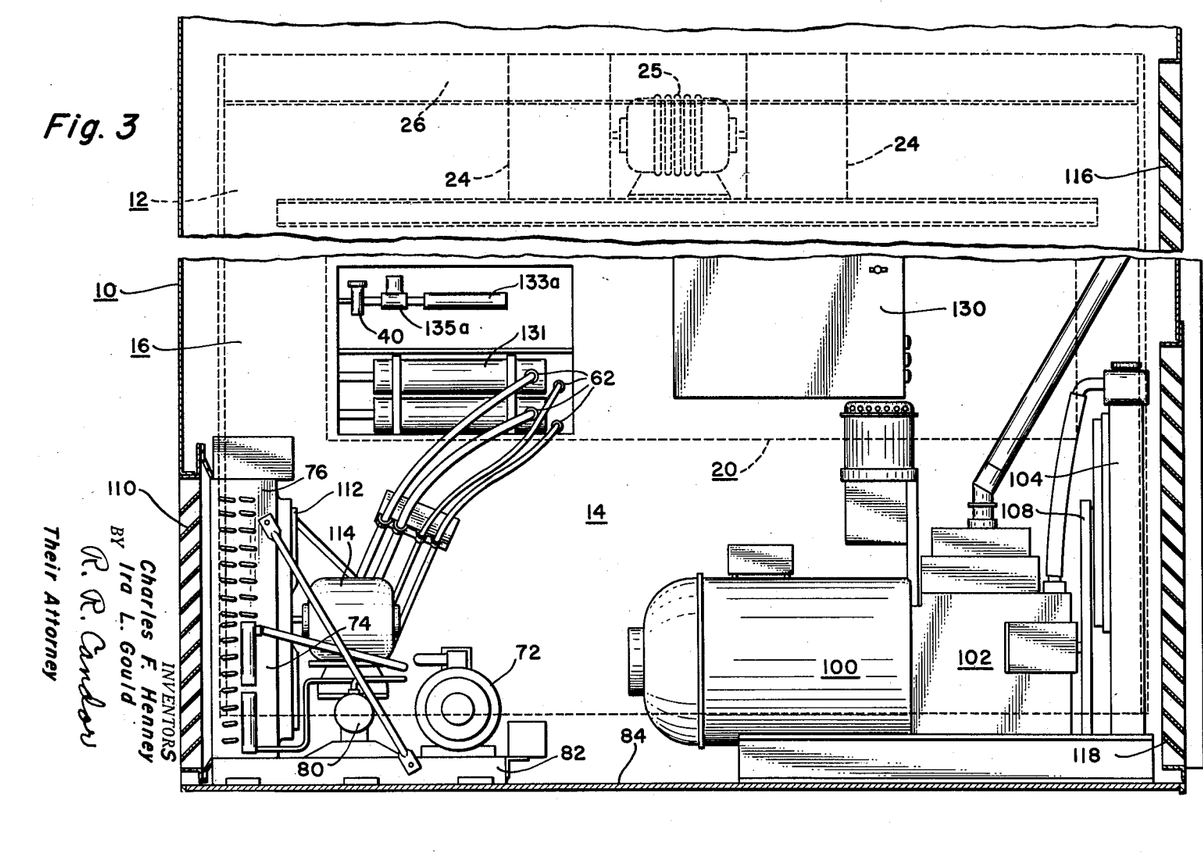
Figure 3 is an end view with parts broken away showing the arrangement of parts within the machinery compartment of the car.

As best shown in Figures 1 and 3 of the drawing, the motor-compressor units 70 and 72, the condensers 74 and 76 and the receivers 78 and 80 are all supported on a common base 82 which rests on the floor 84 of the machinery compartment 14. The power for operating the motor-compressor units 70 and 72 is furnished by an alternator 100 which is adapted to be driven by a diesel engine 102 directly connected to the alternator 100. The engine 102 is provided with the usual engine cooling radiator 104 and fan means 108. The air for cooling the condensers 74 and 76, the engine 102 as well as all of the other machinery in the compartment 14 enters the machinery compartment through a louvered air inlet opening 110 arranged directly opposite the condensers 74 and 76. A condenser fan 112 operated by a motor 114 which is also supplied with power from the alternator 100 serves to forcefully circulate outside air in over the condensers and to discharge the air into the machinery compartment 14. Since the amount of air required for cooling the condensers is far in excess of the amount of air required for cooling the engine radiator, some of the condenser cooling air is allowed to leave the machinery compartment through an outlet grill 116 arranged in the upper part of the machinery compartment and the rest of the air leaves through the air outlet 118 located directly opposite the engine radiator 104.

In actual practice it has been found that for a standard refrigerator car it is desirable to circulate approximately 7,000 cu. ft. of air per minute in over the condensers and to circulate approximately 3,200 cu. ft. of air per minute over the engine radiator 104. It is obvious therefore that approximately 3,800 cu. ft. of air per minute leaves through the air outlet grill 116. By virtue of the above described arrangement, a minimum amount of restriction to the flow of the condenser cooling air is provided and both of the condensers and the engine radiator are adequately cooled at all times.

Figure 2:
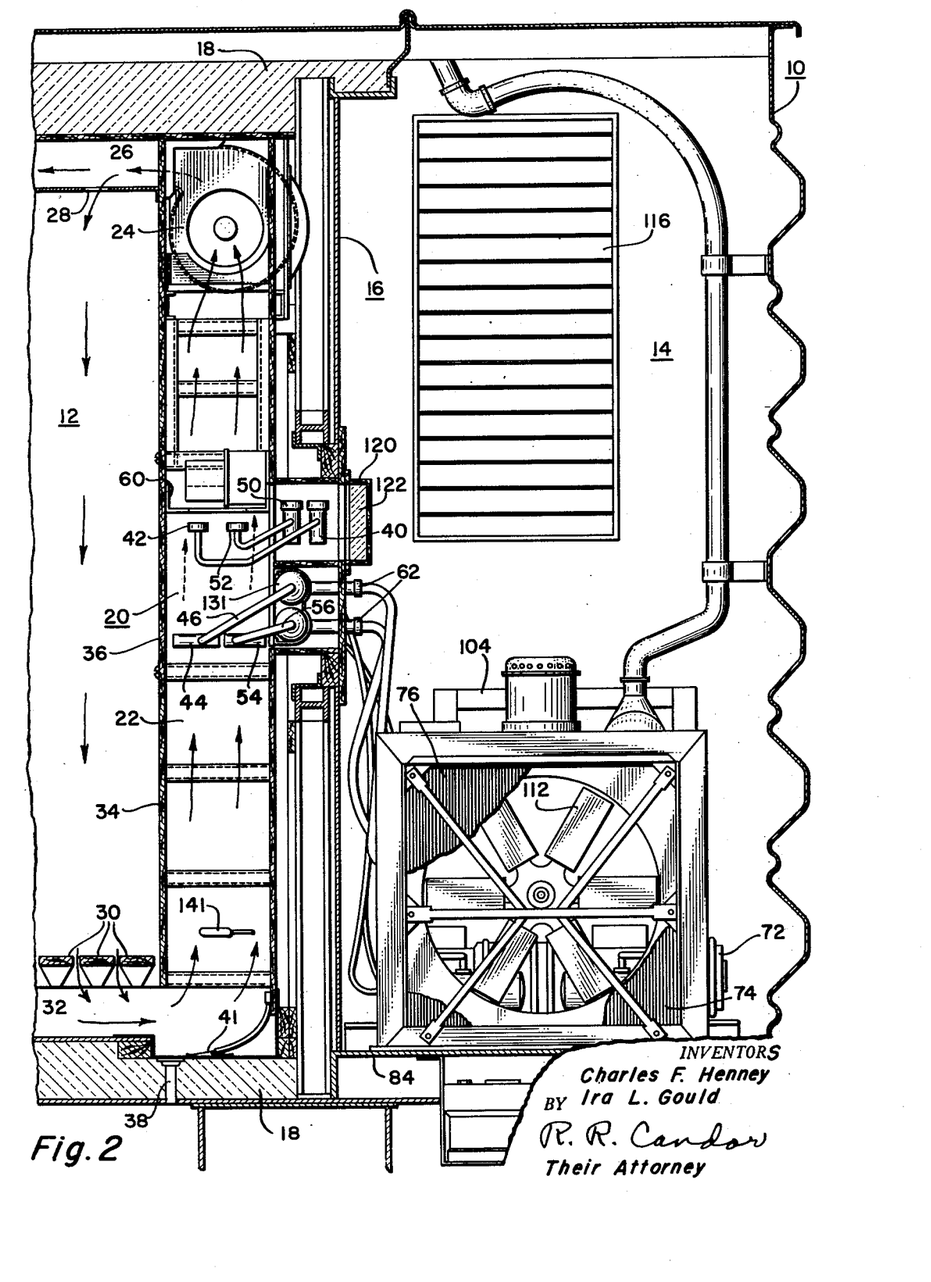
Figure 2 is a side elevational view with parts broken away of the equipment shown in Figure 1.

Since there may be times when it is necessary to have access to the thermostatic expansion valves 40 and 50 from the machinery compartment of the car, a door 120 has been provided as best shown in Figures 2 and 4 which allows access to the expansion valves for inspection or repair purposes. This door is provided with suitable insulation 122 (see Figure 2) so as to prevent heat leakage from the expansion valves into the machinery compartment. By virtue of the fact that the evaporators are installed from the commodity compartment 12 of the car rather than from the machinery compartment of the car, it is obvious that the problem of preventing the leakage of heat from the evaporator compartment into the machinery compartment has been greatly simplified.

Figure 5:
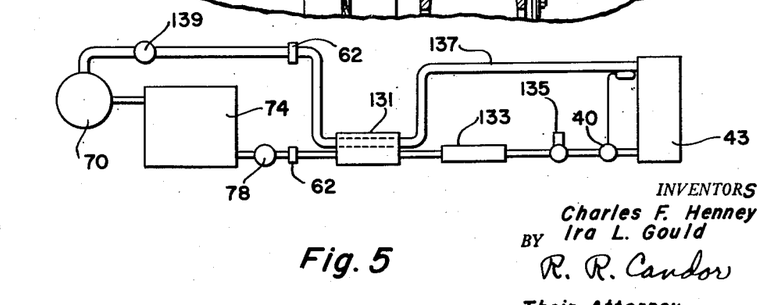
Figure 5 is a schematic view of one of the refrigeration circuits.

Figure 5 of the drawing diagrammatically shows the arrangements of the components in one of the refrigeration systems. Since the components in both refrigeration systems are similar, only the one refrigeration circuit has been shown in Figure 5 with the understanding that the other is like the one shown. As shown in the particular system illustrated in the drawing, the compressor 70 discharges the compressed refrigerant into the condenser 74 wherein the compressed refrigerant vapor is condensed. As shown in Figure 3, the condenser 74 is mounted adjacent the lower half of the condenser air unit opening 110 so as to be cooled by the incoming air. The corresponding condenser 76 for the other system is mounted above the condenser 74 so as to be cooled by the air entering the upper half of the air inlet 110. The refrigerant which is condensed in the condenser 74 is discharged into the receiver 78 from whence the liquid refrigerant flows into a heat interchanger 131 wherein some of the heat in the liquid is given up to the vaporized refrigerant flowing from the evaporator to the compressor. After leaving the heat interchanger 131 the liquid refrigerant flows through a dehydrator 133 wherein any moisture which may be contained in the liquid refrigerant is removed from the refrigerant. After leaving the dehydrator the refrigerant flows through a solenoid operated control valve 135 before entering the thermostatic expansion valve 40. The refrigerant vaporizes at the reduced pressure prevailing in the evaporator and leaves the evaporator through the usual suction line 137 which directs the refrigerant through the heat interchanger 131 before the vaporized refrigerant returns to the compressor. There may be times when the car in which the equipment is mounted has stood unused in the hot sun for several days, and for this reason a pressure regulating valve 139 has been placed in the suction line so as to prevent overloading of the compressor motor at high suction line pressures. This valve is of the type which does not allow the pressure at the outlet side of the valve, which in this case is the compressor side of the valve, from exceeding a predetermined pressure for which the valve is set. The detachable connections 62 are provided in the refrigerant lines at the points indicated so as to facilitate disconnecting the high side of the system from the low side of the system. The solenoid valve 135 which is located in the liquid line as shown is adapted to be controlled by means of a thermostat device 132 which is arranged in the electrical circuit described hereinafter. The thermostat device 132 includes a thermal bulb 141 located in the return air duct 22 below the evaporator assembly 20.

Figure 6:
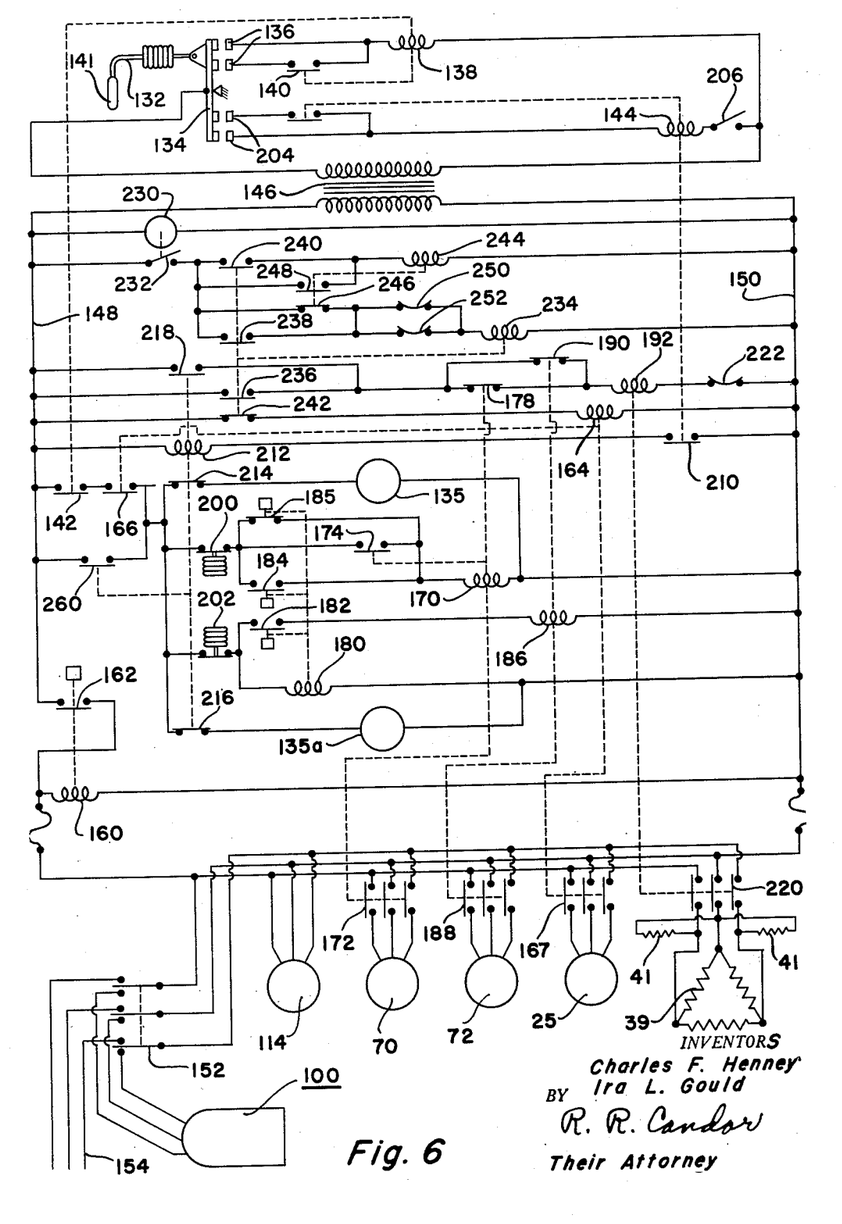
Figure 6 is a schematic wiring diagram showing the control circuits used with the equipment shown in Figures 1 through 4.

The electrical portion of the controls for the apparatus shown herein are diagrammatically illustrated in Figure 6 of the drawings. A control box generally designated by the reference numeral 130 is mounted on the wall 16 of the machinery compartment for housing many of the controls such as the various control relays described hereinafter. The operation of the refrigeration equipment as well as the heating equipment is controlled by means of a main temperature responsive device 132 which actuates the double throw pilot control switch 134 which in turn controls the energization of the cooling pilot relay coil 138 and the heating pilot relay coil 144. As the temperature of the return air in the duct 22 rises the thermostat 132 will cause the contacts 136 to close so as to energize the main cooling pilot relay 138. The pilot relay coils are energized from the secondary side of a transformer 146 so as to operate at a reduced voltage such as 25 volts or thereabouts. The primary side of the transformer is connected to the power lines 148 and 150 which are adapted to be connected by means of the double throw switch 152 either to the output of the alternator 100 or to a suitable standby power source 154 such as commonly provided at various railway sidings and stations.

Assuming now that the double throw switch 152 is in the closed position so as to connect the controls to the output of the alternator 100 and that the thermostat 132 calls for cooling, the first thing that takes place when the alternator 100 begins operating is that the current flowing through the power lines leading from the alternator to the electrical controls will energize the main control circuit timer relay coil 160 which serves to close the delayed operation switch 162 approximately twenty-seconds after the generating voltage has reached the desired value. Closing of the switch 162 serves to supply power to the various controls so as to accomplish automatic operation of the equipment. Whenever the thermostat 132 calls for cooling it is obvious that the cooling pilot relay coil 138 will be energized and that the switches 140 and 142 operated thereby will be closed. Thus closing of the switch 162 causes current to flow through the blower control relay coil 164 which in turn closes the switch 166 which is arranged in series with the cooling pilot relay switch 142 and also closes the main blower switch 167. With the switches 142 and 166 both closed, current is supplied to the compressor motor starting relay 170 which when energized closes the control switch 172 for the compressor motor 70. Energization of the relay 170 also closes the switch 174 and opens the switch 178 which are arranged in the circuit as shown.

At the same time that the compressor control relay coil 170 is energized a similar relay coil 180 will be energized. Energization of the coil 180 causes the delayed action switches 182 and 184 to be closed but only after a delay of several seconds after the switch 174 has been closed so as to prevent the second compressor motor 72 from being energized simultaneously with the first compressor motor 70. Closing of the switch 182 energizes the solenoid coil 186 which serves to close the compressor control switch 188 for the second compressor 72. Energization of the coil 186 also serves to open a switch 190 which is arranged in parallel with the switch 178 as shown. By virtue of the fact that switches 178 and 190 are both open when both of the compressor motors are in operation it becomes impossible to energize the heater control relay coil 192 when the refrigeration systems are in operation.

The refrigerant flow control valves 135 and 135a for the two systems are now energized so as to allow refrigerant to flow to the evaporators as explained hereinabove. A pair of conventional high-low pressure cutout switches 200 and 202 have been provided in the two refrigerating systems so as to automatically stop operation of the refrigeration systems in response to abnormally high or low pressures therein for a purpose to be explained more fully hereinafter. When the temperature conditions in the car have been satisfied so that refrigeration is no longer required, the thermostat 132 will serve to open the circuit to the cooling pilot relay coil 138 and this then opens the switch 142 and shuts off all of the refrigeration equipment.

Assuming now that the temperature in the car falls below a desired value for which the thermostatic control is set, the switch contacts 204 will then be closed thereby energizing the heating pilot relay coil 144 provided the heat lock-out switch 206 is closed. The switch 206 is arranged to be closed whenever the thermostat 132 is set to maintain temperatures below 20° above zero in the refrigerated space, the reason for this being that it has been found that any food which may be stored at temperatures below 20° above zero will not be damaged if the temperature should be further decreased with the result that it would be a mere waste of electricity to apply heat for the purpose of preventing the car temperature from falling below 20° above zero. When the thermostat 132 in the commodity compartment of the car calls for heating and the heat lock-out switch 206 is in the closed position, the heating pilot relay coil 144 will be energized and this closes the heater control pilot switch 210 which in turn energizes the control relay coil 212. When relay coil 212 is energized it opens the switches 214 and 216 so as to thereby deenergize the solenoid operated refrigerant control valves 135 and 135a with the result that no liquid refrigerant is allowed to enter the evaporators when the heat is turned on. Energization of the relay coil 212 also closes the heater control 218 which then energizes the main heater control relay coil 192 as the switches 178 and 190 will both be closed due to the fact that no refrigeration is called for. When the heater control relay coil 192 is energized it causes closing of the main heater switch 220. A protective thermostat 222 located on the evaporator assembly 20 is provided for opening the circuit to the main heater control 192 in the event that the temperature should increase above a predetermined safe value such as 150°.

When the system is used for cooling the commodity compartment of the car, the evaporators will be operated at a temperature low enough to cause the formation of frost therein with the result that it is necessary to provide some means for periodically removing the frost from the evaporators. In the system shown, a defrosting timer clock 230 has been provided and this serves to close a defrost control switch 232 at predetermined intervals such as once every twenty-four hours. This timer clock is of conventional design and is of the type which may be made to defrost at any desired time intervals. Closing of the defrost switch 232 serves to energize the defrost control relay coil 234. Upon energization of the relay coil 234, the switches 236, 238 and 240 are closed and the switch 242 is opened. Opening of the switch 242 deenergizes the blower control relay 164 so as to prevent operation of the blower during the defrost period. Closing of the switch 236 serves to energize the heater control relay coil 192 in the manner described hereinabove with the result that the electric heater means 39 will be energized so as to cause the frost on the evaporators to melt. The switches 232 and 240 are arranged in series with the control relay coil 244 with the result that when both of these switches are closed the relay 244 will be energized and will serve to open the switch 246 and close the switch 248. When the switch 246 is in the open position the defrost control relay 234 will be controlled by the defrost thermostats 250 and 252 located directly on the evaporator sections 43 and 53 so as to respond to temperature changes in the two evaporators. The thermostats 252 are of the snap acting type which close when the temperature falls below 32° F. above zero and open when the temperature exceeds 50° F. By virtue of the above described arrangement the defrosting will be initiated by the defrosting timer clock 230 and the length of time the defrost heaters are energized will be determined by the thermostats 250 and 252 which automatically open the circuit to the defrost relay 234 when the temperature of the coils indicates that all of the ice on the coils has been melted.

It will be noted that the defrost timer clock 230 may initiate the defrosting operation at a time when the refrigerating systems are in full operation and when both of the compressors are operating. The solenoid valves 135 and 135a located in the liquid lines of the refrigeration systems will be closed when the defrosting operation begins so as to prevent continued refrigeration when defrosting is desired. However, energization of the defrost relay 234 does not stop the compressors with the result that as heat is applied to the evaporators the vaporized refrigerant will not build up excessive pressures in the evaporators but will be withdrawn from the evaporators by the compressors. The compressors will continue to operate until their low pressure cutouts 200 and 202 stop them.

While the form of embodiment of the invention as herein disclosed constitutes a preferred form, it is to be understood that other forms might be adopted, as may come within the scope of the claims which follow.

What is claimed is as follows:

1. In a refrigerated railway car, an outer shell, an inner shell forming a commodity compartment to be refrigerated, insulating means between said inner and outer shells, one end of said inner shell being spaced from the adjacent end of said outer shell so as to form a machinery compartment, a first refrigerating system including a compressor, condenser and evaporator connected in series refrigerant flow relationship, a second refrigerating system including a compressor, condenser and evaporator connected in series flow relationship, means for circulating air in thermal exchange relationship with said evaporators and said commodity compartment, electric heater means, arranged in thermal exchange relationship with said evaporators, a first normally closed solenoid valve for controlling the flow of liquid refrigerant to the evaporator of said first refrigerating system, a second normally closed solenoid valve for controlling the flow of liquid refrigerant to the evaporator of said second refrigerating system, a first motor for operating the compressor of said first refrigerating system, a second motor for operating the compressor of said second refrigerating system, thermostat means responsive to the temperature of the air in said commodity compartment, a first pilot switch operated by said thermostat means in response to a predetermined increase in temperature, circuit means energized by said first pilot switch for supplying current to said first and second solenoid valves so as to open said valves and to said first and second motors so as to energize said motors, second switch means operated by said thermostat means in response to a predetermined decrease in car temperature, said circuit means including means energized in response to closing of said second switch means for energizing said electric heater means at temperatures below a predetermined value, and means responsive to closing of said second switch means for opening the circuit to said solenoid valves so as to prevent the flow of liquid refrigerant into said evaporators while said heater means is energized.

2. In a refrigerated railway car, an outer shell, an inner shell forming a commodity compartment to be refrigerated, insulating means between said inner and outer shells, one end of said inner shell being spaced from the adjacent end of said outer shell so as to form a machinery compartment, a first refrigerating system including a compressor, condenser and evaporator connected in series refrigerant flow relationship, a second refrigerating system including a compressor, condenser and evaporator connected in series flow relationship, means for circulating air to be conditioned for said commodity compartment in thermal exchange relationship with said evaporators, electric heater means arranged in thermal exchange relationship with said evaporators, a first solenoid valve for controlling the flow of liquid refrigerant to the evaporator of said first refrigerating system, a second solenoid valve for controlling the flow of refrigerant to the evaporator of said second refrigerating system, a first motor for operating the compressor of said first refrigerating system, a second motor for operating the compressor of said second refrigerating system, a thermostat responsive to the temperature of the air in said commodity compartment, a first switch operated by said thermostat, circuit means energized by said first switch for supplying current to said first and second solenoid valves and to said first and second motors, a second switch operated by said thermostat, said circuit means including means energized in response to closing of said second switch for energizing said electric heater means, and means responsive to closing of said second switch for opening the circuit to said solenoid valves, so as to prevent the flow of liquid refrigerant into said evaporators while said heater means is energized, said circuit means including means for disconnecting said heater means when said thermostat is set to maintain temperatures below a predetermined value.

3. In a refrigerated railway car, means forming a commodity compartment to be refrigerated, a first refrigerating system including a compressor, condenser and evaporator connected in series refrigerant flow relationship, a second refrigerating system including a compressor, condenser and evaporator connected in series flow relationship, means for circulating air to be conditioned for said commodity compartment in thermal exchange relationship with said evaporators, electric heater means arranged in thermal exchange relationship with said evaporators, a first solenoid valve for controlling the flow of liquid refrigerant to the evaporator of said first refrigerating system, a second solenoid valve for controlling the flow of liquid refrigerant to the evaporator of said second refrigerating system, a first motor for operating the compressor of said first refrigerating system, a second motor for operating the compressor of said second refrigerating system, a thermostat responsive to the temperature of the air in said commodity compartment, first switch means operated by said thermostat, circuit means energized by said first switch means for supplying current to said first and second solenoid valves and to said first and second motors, defrost control means including a second switch means for periodically energizing said heater means, and means responsive to closing of said second switch means for opening the circuit to said solenoid valves without opening the circuit to said motors so as to prevent the flow of liquid refrigerant into said evaporators while said heater means is energized.

4. In a refrigerated railway car, means forming a commodity compartment to be refrigerated, a first refrigerating system including a compressor, condenser and evaporator connected in series refrigerant flow relationship, a second refrigerating system including a compressor, condenser and evaporator connected in series flow relationship, means for circulating air to be conditioned for said commodity compartment in thermal exchange relationship with said evaporators, electric heater means arranged in thermal exchange relationship with said evaporators, a first solenoid valve for controlling the flow of liquid refrigerant to the evaporator of said first refrigerating system, a second solenoid valve for controlling the flow of liquid refrigerant to the evaporator of said second refrigerating system, a first motor for operating the compressor of said first refrigerating system, a second motor for operating the compressor of said second refrigerating system, a thermostat responsive to the temperature of the air in said commodity compartment, first switch means operated by said thermostat, circuit means energized by said first switch means for supplying current to said first and second solenoid valves and to said first and second motors, defrost control means including a second switch means for periodically energizing said heater means, and means responsive to closing of said second switch means for opening the circuit to said solenoid valves without opening the circuit to said motors so as to prevent the flow of liquid refrigerant into said evaporators while said heater means is energized, each of said refrigerating systems including means for deenergizing its compressor operating motor in response to a predetermined decrease in refrigerant pressure therein.

5. In a refrigerated railway car, means forming a commodity compartment to be refrigerated, a first refrigerating system including a compressor, condenser and evaporator connected in series refrigerant flow relationship, a second refrigerating system including a compressor, condenser and evaporator connected in series refrigerant flow relationship, means for circulating air to be conditioned for said commodity compartment in thermal exchange relationship with said evaporators, electric heater means arranged in thermal exchange relationship with said evaporators, a first solenoid valve for controlling the flow of liquid refrigerant to the evaporator of said first refrigerating system, a second solenoid valve for controlling the flow of refrigerant to the evaporator of said second refrigerating system, a first motor for operating the compressor of said first refrigerating system, a second motor for operating the compressor of said second refrigerating system, a thermostat responsive to the temperature of the air in said commodity compartment, first switch means operated by said thermostat, circuit means energized by said first switch means for supplying current to said first and second solenoid valves and to said first and second motors, second switch means operated by said thermostat, said circuit means including means energized in response to closing of said second switch means for energizing said electric heater means at temperatures below a predetermined value, means responsive to closing of said second switch means for opening the circuit to said solenoid valve means so as to prevent the flow of liquid refrigerant into said evaporators while said heater means is energized, clock operated switch means in said circuit for periodically energizing said heater means for defrosting said evaporators, each of said refrigerating systems including means responsive to a predetermined reduction in the pressure at the inlet of its compressor for deenergizing the motor for operating its compressor.

6. In a refrigerated railway car, means forming a commodity compartment to be refrigerated, a first refrigerating system including a compressor, condenser and evaporator connected in series refrigerant flow relationship, a second refrigerating system including a compressor, condenser and evaporator connected in series flow relationship, means for circulating air to be conditioned for said commodity compartment in thermal exchange relationship with said evaporators, electric heater means arranged in thermal exchange relationship with said evaporators, a first solenoid valve for controlling the flow of liquid refrigerant to the evaporator of said first refrigerating system, a second solenoid valve for controlling the flow of liquid refrigerant to said second refrigerating system, a first motor for operating the compressor of said first refrigerating system, a second motor for operating the compressor of said second refrigerating system, a thermostat responsive to the temperature of the air in said commodity compartment, first switch means operated by said thermostat, circuit means energized by said first switch means for supplying current to said first and second solenoid valves and to said first and second motors, second switch means operated by said thermostat, said circuit means including means energized in response to closing of said switch means for energizing said electric heater means at temperatures below a predetermined value, means responsive to closing of said second switch means for opening the circuit to said valve means so as to prevent the flow of liquid refrigerant into said evaporators while said heater means is energized, and means for preventing overloading of said compressor operating motors including a first pressure regulating valve for controlling the flow of refrigerant to the compressor of said first refrigerating system and a second pressure regulating valve for controlling the flow of refrigerant to the compressor of said second refrigerating system.

7. In a refrigerated railway car, an outer shell, an inner shell forming a commodity compartment, insulating means between said inner and outer shells, the top, bottom, and at least one end wall of said inner shell being spaced inwardly from said insulation so as to form air passage means, a refrigerant evaporator disposed in a vertical portion of said air passage means adjacent one end of said inner shell, said end of said inner shell having a removable panel portion, means for removably supporting said evaporator behind said removable panel, refrigerant liquefying means, refrigerant flow connections between said evaporator and said refrigerant liquefying means, said refrigerant flow connections including thermostatic valve means, said one end of said inner shell being spaced from the adjacent end of said outer shell so as to form a machinery compartment, said refrigerant liquefying means being disposed in said machinery compartment, insulated wall means separating the vertical portion of said air passage from said machinery compartment, said insulated wall means having an opening therein in which said thermostatic expansion valve means is supported, and an insulated door for said opening.

8. In a refrigerated railway car, an outer shell, an inner shell forming a commodity compartment, insulating means between said inner and outer shells, the top, bottom, and at least one end wall of said inner shell being spaced inwardly from said insulation so as to form air passage means, a refrigerant evaporator disposed in a vertical portion of said air passage means adjacent one end wall of said inner shell, said end wall of said inner shell having a removable panel portion, means for removably supporting said evaporator behind said removable panel, refrigerant liquefying means, refrigerant flow connections between said evaporator and said refrigerant liquefying means, said refrigerant flow connections including thermostatic valve means, said one end of said inner shell being spaced from the adjacent end of said outer shell so as to form a machinery compartment, said refrigerant liquefying means being disposed in said machinery compartment, insulated wall means separating the vertical portion of said air passage from said machinery compartment, said wall means having an opening therein in which said thermostatic expansion valve is supported, and an insulated door for said opening, said opening being arranged in alignment with a portion of said evaporator and being smaller in cross section area than the area of said removable panel.

9. In a refrigerated railway car, an outer shell, an inner shell forming a commodity compartment, insulating means between said inner and outer shells, the top, bottom, and at least one end wall of said inner shell being spaced inwardly from said insulation so as to form air passage means, a refrigerant evaporator disposed in a vertical portion of said air passage means adjacent one end of said inner shell, said end of said inner shell having a first opening provided with a removable panel portion, means for removably mounting said evaporator for removal through said opening, said one end of said inner shell being spaced from the adjacent end of said outer shell so as to form a machinery compartment, refrigerant liquefying means disposed in said machinery compartment, refrigerant flow connections between said evaporator and said refrigerant liquefying means, said refrigerant flow connections including a thermostatic expansion valve, an insulated wall separating the vertical portion of said air passage from said machinery compartment, said wall having a second opening therein in which said thermostatic expansion valve is supported, and an insulated cover for said second opening, said second opening being arranged in alignment with a portion of said evaporator and being smaller in cross sectional area than the area of said first opening, said refrigerant flow connections including detachable connections within said machinery compartment whereby said evaporator and expansion valve may be disconnected from said refrigerant liquefying means.

10. In a refrigerated railway car; an outer shell; an inner shell forming a commodity compartment; one end of said inner shell being spaced from the adjacent end of said outer shell so as to form a machinery compartment; insulating means between said inner and outer shells; the top, bottom, and at least one end wall of said inner shell being spaced inwardly from said insulation so as to form air passage means; a refrigerant evaporator disposed in a vertical portion of said air passage means adjacent one end of said inner shell, the walls of said vertical portion of said air passage means having removable panel portions therein; refrigerant liquefying means located in said machinery compartment; refrigerant flow connections between said evaporator and said refrigerent liquefying means; said refrigerant flow connections including a thermostatic expansion valve located adjacent one of said removable panel portions; said refrigerant flow connections also including detachable connections within said machinery compartment whereby said evaporator and thermostatic expansion valve may be disconnected from said refrigerant liquefying means; said evaporator and said expansion valve being removable as a unit from the commodity compartment side of the wall through the opening formed by removing one of said removable panel portions.

11. In a refrigerated railway car, an outer shell, an inner shell forming a commodity compartment to be refrigerated, insulating means between said inner and outer shells, one end of said inner shell being spaced from the adjacent end of said outer shell so as to form a machinery compartment, a first refrigerating system including a compressor, condenser and evaporator connected in series refrigerant flow relationship, a second refrigerating system including a compressor, condenser and evaporator connected in series flow relationship, means for circulating air in thermal exchange relationship with said evaporators and said commodity compartment, heater means arranged in thermal exchange relationship with said evaporators, a first valve for controlling the flow of liquid refrigerant to the evaporator of said first refrigerating system, a second valve for controlling the flow of liquid refrigerant to the evaporator of said second refrigerating system, a first motor for operating the compressor of said first refrigerating system, a second motor for operating the compressor of said second refrigerating system, thermostat means responsive to the temperature of the air in said commodity compartment, a first control means operated by said thermostat means in response to a predetermined increase in temperature to open said valves and energize said motors, second control means operated by said thermostat means in response to a predetermined decrease in car temperature for energizing said electric heater means at temperatures below a predetermined value, and means to prevent the flow of liquid refrigerant into said evaporators while said heater means supplies heat to said evaporators.

12. In a refrigerated railway car, means forming a commodity compartment to be refrigerated, a first refrigerating system including a compressor, condenser and evaporator connected in series refrigerant flow relationship, a second refrigerating system including a compressor, condenser and evaporator connected in series flow relationship, means for circulating air to be conditioned for said commodity compartment in thermal exchange relationship with said evaporators, heater means arranged in thermal exchange relationship with said evaporators, a first valve for controlling the flow of liquid refrigerant to the evaporator of said first refrigerating system, a second valve for controlling the flow of liquid refrigerant to said second refrigerating system, a first motor for operating the compressor of said first refrigerating system, a second motor for operating the compressor of said second refrigerating system, a thermostat responsive to the temperature of the air in said commodity compartment, first control means operated by said thermostat for controlling said first and second valves and said first and second motors, second control means operated by said thermostat including means for energizing said heater means at temperatures below a predetermined value, means to prevent the flow of liquid refrigerant into said evaporators while said heater means supplies heat, and means for preventing overloading of said compressor operating motors including a first pressure regulating valve for controlling the flow of refrigerant to the compressor of said first refrigerating system and a second pressure regulating valve for controlling the flow of refrigerant to the compressor of said second refrigerating system.

References Cited in the file of this patent

UNITED STATES PATENTS

| | | |
|---|---|---|
| 2,231,012 | Kleist | Feb. 11, 1941 |
| 2,285,946 | Kalischer | June 9, 1942 |
| 2,506,448 | Gregor | May 2, 1950 |
| 2,513,679 | Ritter | July 4, 1950 |
| 2,641,110 | Pike | June 9, 1953 |
| 2,694,553 | Hicke et al. | Nov. 16, 1954 |
| 2,696,086 | Jones | Dec. 7, 1954 |